May 23, 1967  R. TOUVAY  3,321,289
ROTATABLE CURRENT BAFFLE IN GLASS FLOW FURNACE
Filed Nov. 5, 1962
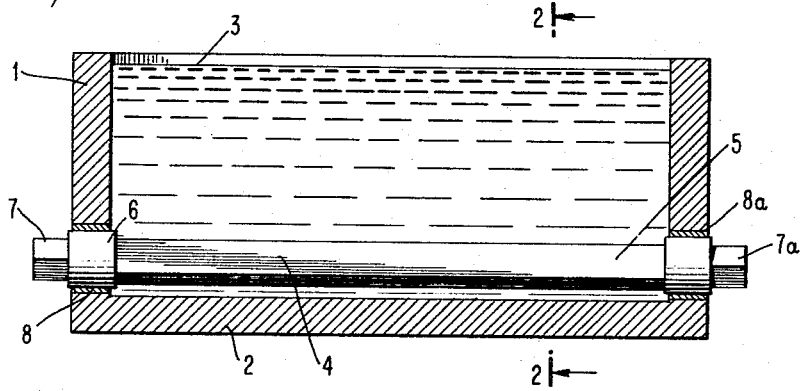
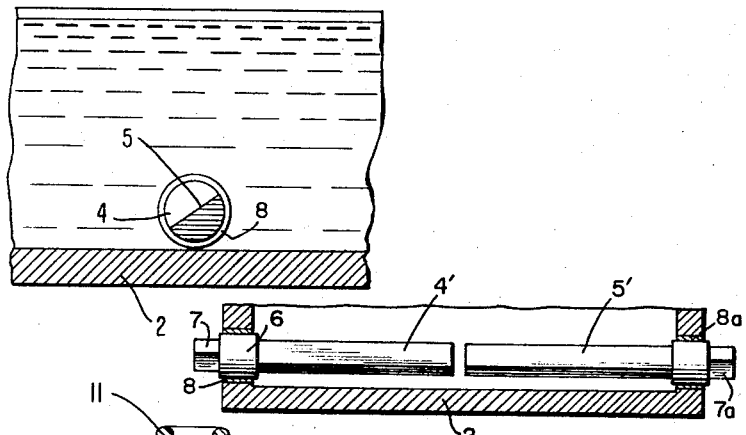
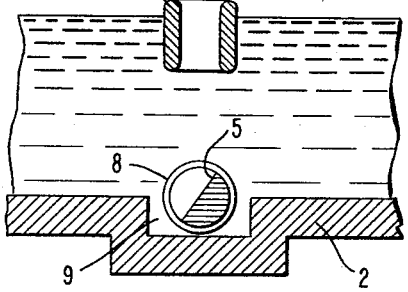
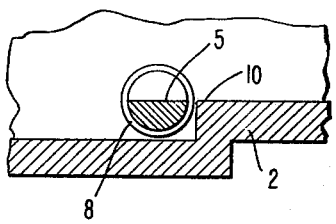
INVENTOR.
ROBERT TOUVAY
BY
*Bauer and Seymour*
ATTORNEYS

United States Patent Office 3,321,289
Patented May 23, 1967

3,321,289
ROTATABLE CURRENT BAFFLE IN GLASS
FLOW FURNACE
Robert Touvay, Paris, France, assignor to Compagnie de
Saint-Gobain, Neuilly-sur-Seine, France
Filed Nov. 5, 1962, Ser. No. 235,451
Claims priority, application France, Nov. 17, 1961,
879,310
10 Claims. (Cl. 65—340)

This invention relates to tank furnaces for the manufaucture of glass, and other thermosoftening materials, in which the process of manufacture involves the flow of circulating currents. As the invention is particularly adapted to the manufacture of glass by the continuous process in tank furnaces wherein the raw materials are admitted to the furnace at one end and the finished glass is withdrawn at the other end, the invention will be described in connection with that process.

In the manufacture of glass by the continuous flow process the glass is made in an elongated, rectangular tank. The raw materials are admitted at one end, are melted, usually by flame or electricity, are fined in a zone to the tank to which they progress, are conditioned, and are brought to working temperature in a zone adjacent the place of discharge. The withdrawal may be upward, as a sheet from the surface of the bath, or by discharge from forehearths and feeders of various sorts. During the course of manufacture, circulating currents are set up in the tank because of the differences of temperature existing between the various zones of the glass and parts of the tank, the cold side walls tend to establish descending currents and the hot area of the fining zone tends to establish ascending currents. There is, in particular, a flow of glass along the sole of the furnace from the discharge end toward the feeding end. However, this current results in efficiency in the process leading to an unnecessary consumption of heat.

It is an object of this invention to improve the manufacture of glass and reduce the consumption of heat in such furnaces. The objects of the invention are accomplished, generally speaking, by a method of making glass in a continuous flow furnace which has a current in the glass proceeding toward a zone of discharge of glass and a current proceeding away from said zone, which comprises regulating the flow of the current proceeding away from said zone and thereby establishing the time during which the glass is retained in the said zone. The rate of flow of the upper longitudinal current involves not only the current which is established by the withdrawal of glass, but a flow which is set up by the return current which proceeds from the discharge toward the head end. The latter is generally larger than the former. The calorie content of the return current is a factor which must be taken into consideration in establishing the temperature of the glass in the discharge zone, and it is, consequently, a function of the magnitude of the return current. In order to understand the basis of the invention, it must be realized that the fined glass in the working zone is removed from that zone and returned toward the head end of the furnace, to be mingled with unfined glass. This results in an unnecessary reheating and reprocessing of fined glass and in an unnecessary consumption of heat. Furthermore, while the return current may have some advantage in working on cold raw materials, its temperature is not high enough to make it the most effective agent for that purpose. Furthermore, it has been recognized that fined glass at working temperature is best kept quiet and the excessively rapid flow out of the working zone tends to disturb the glass. Furthermore, I have established that a certain amount of return from the discharge end toward the head end is desirable, and that it is not altogether desirable to completely isolate the working zone.

It is another object of this invention to correct the imperfections recited hereinabove. To this end the invention involves the regulation of the return current at one or more points of the tank, and adjustable means for controlling that current. The apparatus of this invention can also be used to control the flow of other currents which are set up within a glass furnace, such as the currents which descend the lateral walls of the tank. The novel apparatus can be mounted at will in the furnace to control any chosen current.

The apparatus of the invention is constituted by a baffle which is disposed transversely to the current which is to be controlled. In the case of the longitudinal return current it will be mounted conveniently in the side walls in the path of that current. In the preferred form, the baffle is rotatably mounted in the walls of the furnace, usually near the bottom, and it will have a flat face and a round face, for instance derived from a demi-cylindrical shape, so that by raising the flat face higher and higher the height of the baffle is increased and its effect on the return current increases with it. In the preferred form of the invention the baffle is composed of a demi-cylinder having a plane face which extends along the axis of the cylinder. Means is provided, outside the furnace, to turn it to any desired position. It may be mounted in the walls of the furnace in water cooled bearings of known type, and it may be conveniently made or lined of graphite.

In the accompanying drawings is shown a diagrammatic representation of various method of locating and mounting the baffle.

FIG. 1 is a vertical cross section through the tank of the furnace, the dome being omitted, showing the mounting of the baffle near the sole of the furnace for the purpose of controlling the returning current which flows along the bottom;

FIG. 2 is a section on the line 2—2 of FIG. 1;

FIGS. 3 and 4 are in section through a furnace showing modified forms of mounting the baffle;

FIG. 5 is similar to FIG. 1, showing a modification.

In the figures of the drawings the numerals 1, 1a illustrate the side walls of the furnace, the numeral 2 indicates the sole and the numeral 3 indicates the glass level. The baffle extends across the furnace from wall to wall transversely to the flow of longitiudinal current. It is constituted by a half cylinder 4 of which the plane face is a diameter of the cylinder. The baffle is cylindrical for a length corresponding to the thickness of the wall 1, 1a. These cylindrical portions are mounted in bearings 8, which may be of graphite or water-cooled metal preferably lined with graphite. From the cylindrical sections extend square ends 7, 7a which may be used to turn the baffle to the positions desired for the control of the current. The baffle may be placed in the bottom of the tank near the sole of the furnace as represented in FIGS. 1 and 2, but it may also be advantageously placed in a recess 9 in the sole of the furnace (FIG. 3) the recess being of such depth that the flat face 5 of the baffle forms a continuation of the sole when it is rotated into horizontal position. In a vertical position the baffle will have a height above the sole equal to its radius. In certain situations this construction has advantages over that shown in FIG. 2 wherein the baffle may have a vertical extent equal to its diameter.

As shown in FIG. 3 the baffle according to the invention may be utilized with an upper baffle such as for example a floating baffle 11.

In FIG. 4 the floor of the furnace is provided with a step 10 and the baffle is placed upstream adjacent the step. In this case also it is frequently advantageous to mount the baffle so that, in effect, the horizontal position will constitute a continuation of the raised portion of the sole.

The baffle according to the present invention may be advantageously made of graphite because the graphite being not wetted by the glass the frictions due to the glass currents are small.

By means of this invention the velocity and magnitude of the return flow can be controlled so as to maintain quiet in the working zone, to reduce the magnitude of the current in the process, to avoid the useless reheating of fined glass, and to reduce the overall cost of melting the glass.

The invention, consequently, contributes largely to the thermodynamic effectiveness of glass furnaces. It is simple of construction and effective of operation.

According to a modification which is shown in FIG. 5, the baffle may be composed of two parts, 4', 5', one mounted in each wall, their inner ends being adjacent to one another. This modified construction enables one to regulate the importance of the return flow to one side or the other of the furnace and thus to correct those unforeseen conditions of hot spots, dead spots, which tend to develop in some furnaces.

As many apparently widely different embodiments of the present invention may be made without departing from the spirit and scope thereof, it is to be understood that the invention is not limited to the specific embodiments.

What is claimed is:

1. A glass furnace of continuous flow type in which the currents tend to form and to move out of the working zone, having a current controlling baffle extending into the path of the currents, the baffle being composed of a rotor having a plurality of faces of different shape which act differently when opposed to the flow of a glass current, and means to rotate said baffle.

2. A glass furnace according to claim 1 in which a fixed horizontal baffle extends across the furnace above, in spaced relation, and substantially parallel to the rotor.

3. A tank furnace for the manufacture of glass, having means for controlling the longitudinal flow of molten glass along the bottom of the tank, said means comprising a baffle extending transversely across the bottom of the tank in the path of the said flow, means to mount the baffle for rotation about an axis transverse to the tank, said baffle having a cross-section such that rotation of the baffle about its axis alters the cross-section of the tank and changes the height of the baffle with respect to the floor of the tank, and means to turn the baffle about its axis of rotation.

4. A tank furnace according to claim 3 wherein the baffle is supported at each end in bearings in the side walls.

5. A tank furnace according to claim 3 wherein the baffle is a half cylinder mounted with its axis of rotation in the plane of the half cylinder.

6. A tank furnace according to claim 7 wherein the baffle is a half cylinder of which the radius is substantially equal to the depth of the recess.

7. A glass furnace according to claim 3 having a transversely extending recess in the bottom, said baffle being rotatably mounted in the recess.

8. A glass according to claim 3 having a step in the bottom thereof, said baffle being a baffle rotatably mounted downstream of the step.

9. A glass furnace of continuous flow type in which the currents tend to form and to move out of the working zone, having a current-controlling baffle extending into the path of the currents, the baffle being composed of a plurality of independently rotatable sections each of which has a plurality of faces of different shape which act differently when opposed to the flow of a glass current, and means to rotate each baffle.

10. A glass furnace having side walls and a bottom, bearings in the walls, and a rotatable baffle mounted in the bearings and extending across the furnace adjacent the bottom in the region of longitudinal currents, said baffle including a plane face and a semi-circular face, and means to turn the baffle.

References Cited by the Examiner
UNITED STATES PATENTS

| | | | |
|---|---|---|---|
| 1,002,375 | 9/1911 | Dixon | 65—340 |
| 1,868,858 | 7/1932 | Thum | 65—134 |
| 2,677,003 | 8/1954 | Arbeit et al. | 65—346 |

DONALL H. SYLVESTER, *Primary Examiner.*

D. CRUPAIN, F. W. MIGA, *Assistant Examiners.*